United States Patent
Shim et al.

(10) Patent No.: US 7,394,735 B2
(45) Date of Patent: Jul. 1, 2008

(54) APPARATUS AND METHOD OF UPDATING FILTER TAP COEFFICIENTS OF AN EQUALIZER

(75) Inventors: Jae-seong Shim, Seoul (KR); Hyun-soo Park, Seoul (KR); Jae-wook Lee, Seoul (KR); Jung-hyun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 10/429,954

(22) Filed: May 6, 2003

(65) Prior Publication Data
US 2003/0227842 A1 Dec. 11, 2003

(30) Foreign Application Priority Data
May 21, 2002 (KR) .................. 10-2002-0028169

(51) Int. Cl.
*G11B 7/004* (2006.01)
(52) U.S. Cl. .............. 369/47.15; 369/53.13; 369/47.14
(58) Field of Classification Search .................. None
See application file for complete search history.

(56) References Cited

U.S. PATENT DOCUMENTS

| | | | | |
|---|---|---|---|---|
| 4,802,152 A | * | 1/1989 | Markvoort et al. | 369/30.22 |
| 4,817,073 A | * | 3/1989 | Suzuki | 369/44.28 |
| 5,214,626 A | * | 5/1993 | Satoh et al. | 369/30.23 |
| 5,280,395 A | * | 1/1994 | Matsuzaki | 360/31 |
| 5,420,838 A | * | 5/1995 | Maeda et al. | 369/30.09 |
| 5,563,861 A | * | 10/1996 | Kudo et al. | 369/53.12 |
| 5,777,967 A | * | 7/1998 | Ishibashi et al. | 369/59.2 |
| 5,901,175 A | | 5/1999 | Limberg | |
| 6,124,997 A | * | 9/2000 | Hirasaka | 360/65 |
| 6,172,954 B1 | * | 1/2001 | Masuda | 369/47.26 |
| 6,577,568 B1 | * | 6/2003 | Konishi et al. | 369/44.32 |
| 6,587,407 B1 | * | 7/2003 | Nakamura et al. | 369/44.14 |
| 6,678,230 B2 | * | 1/2004 | Miyashita et al. | 369/53.16 |

FOREIGN PATENT DOCUMENTS

| | | |
|---|---|---|
| JP | 2-237307 | 9/1990 |
| JP | 4-353672 | 12/1992 |
| JP | 5-128729 | 5/1993 |

(Continued)

OTHER PUBLICATIONS

Office Action issued in Chinese Patent Application No. 2006100680087 on May 25, 2007.

*Primary Examiner*—Andrea Wellington
*Assistant Examiner*—Michael V Battaglia
(74) *Attorney, Agent, or Firm*—Stein, McEwen & Bui, LLP

(57) ABSTRACT

An apparatus, a method, and a computer readable recording medium thereof to update filter tap coefficients of an equalizer include a defect signal detection unit and a coefficient updating unit. The defect signal detection unit receives a sampled input signal reflected from an optical disc and/or a track jump signal, detects whether the input signal and/or the track jump signal are defective, and outputs an update stop signal indicative thereof. The coefficient updating unit stops the updating of the filter tap coefficients in response to the update stop signal and outputs current filter tap coefficients.

26 Claims, 12 Drawing Sheets

FOREIGN PATENT DOCUMENTS

| | | |
|---|---|---|
| JP | 6-77772 | 3/1994 |
| JP | 6-162422 | 6/1994 |
| JP | 9-245435 | 9/1997 |
| JP | 11-234369 | 8/1999 |
| JP | 2003-59186 | 2/2003 |
| KR | 2001-45325 | 6/2001 |

* cited by examiner

APPARATUS AND METHOD OF UPDATING FILTER TAP COEFFICIENTS OF AN EQUALIZER

CROSS-REFERENCE TO RELATED APPLICATIONS

This application claims the priority of Korean Patent Application No. 2002-28169, filed on May 21, 2002 in the Korean Industrial Property Office, the disclosure of which is incorporated herein in its entirety by reference.

BACKGROUND OF THE INVENTION

1. Field of the Invention

The present invention relates to updating of filter tap coefficients of an equalizer, and more particularly, to an apparatus and method for updating filter tap coefficients of an equalizer, where the filter tap coefficients of the equalizer are normally updated without errors even when a defect is generated on an optical disc or track jumping occurs in an optical disc recording/reproducing apparatus.

2. Description of the Related Art

In order to increase a recording density of an optical disc, a partial response maximum likelihood (PRML) reading technique adopting a Viterbi decoding technique is used. An equalizer having a finite impulse response (FIR) filter unit including a plurality of digital filters is installed at a front portion of a Viterbi decoder, and equalizes waveforms of a radio frequency (RF) signal reflected by an optical disc so that the RF signal has a level required by the Viterbi decoder.

However, if defects exist on the optical disc or track jumping occurs, the RF signal becomes unstable. Accordingly, an error is generated in updating filter tap coefficients of the equalizer, so that the filter tap coefficients are diffused to unstable area values. Therefore, the equalizer becomes unstable, and, thus, freezing or breaking of image screens occurs.

SUMMARY OF THE INVENTION

In accordance with an aspect of the present invention, there is provided an apparatus updating filter tap coefficients of an equalizer, by which the filter tap coefficients of the equalizer can be normally updated without errors even when a defect exists on an optical disc or track jumping occurs.

According to an aspect of the present invention, there is provided a method of updating the filter tap coefficients of an equalizer, by which the filter tap coefficients of the equalizer can be normally updated without errors even when a defect exists on an optical disc or track jumping occurs.

According to an aspect of the present invention, there is provided an apparatus updating filter tap coefficients of an equalizer, in which a filter unit filter s an error signal in an input signal, wherein the input signal is a radio frequency (RF) signal reflected from an optical disc. A defect signal detection unit detects whether the input signal is defective and outputs an update stop signal indicative thereof. A coefficient updating unit stops the updating of the filter tap coefficients in response to the update stop signal and outputs current filter tap coefficients to the filter unit.

According to an aspect of the present invention, the defect signal detection unit receives a track jump signal, detects whether the track jump signal is defective, and outputs the update stop signal indicative thereof. The filter tap coefficient apparatus further includes a control unit outputting a predetermined reference voltage indicative of whether the input signal is defective to the defect signal detection unit.

According to an aspect of the present invention, there is also provided an apparatus for updating filter tap coefficients of an equalizer, in which a filter unit filters an error signal included in an input signal, wherein the input signal is an RF signal reflected from an optical disc. A coefficient updating unit updates the filter tap coefficients and output s the updated filter tap coefficients to the filter unit. A control unit outputs predetermined initial filter tap coefficient values. An initial coefficient value storage unit receives the initial filter tap coefficient values from the control unit, stores the received initial filter tap coefficient values, and outputs the initial filter tap coefficient values to the coefficient updating unit. A re-initialization signal generation unit receives the filter tap coefficients from the coefficient updating unit, detects whether the filter tap coefficients are diffused, generates a filter tap coefficient re-initialization signal when the filter tap coefficients are diffused, and outputs the filter tap coefficient re-initialization signal to the coefficient updating unit. The coefficient updating unit updates filter tap coefficients using the initial filter tap coefficient values received from the initial coefficient value storage unit in response to the filter tap coefficient re-initialization signal.

According to an aspect of the present invention, the re-initialization signal generation unit includes: an adder receiving filter tap coefficients from the coefficient updating unit, adding the received filter tap coefficients, and outputting an output value indicative thereof; and a comparator comparing the output value of the adder with a predetermined reference value.

According to an aspect of the present invention, the adder obtains a sum T1 of the filter tap coefficients received from the coefficient updating unit, and the comparator receives a bottom threshold TH1 and a top threshold TH2 from the control unit and outputs the filter tap coefficient re-initialization signal when the sum T1 is smaller than the bottom threshold TH1 or greater than the top threshold TH2.

According to an aspect of the present invention, the initial coefficient value storage unit receives from the control unit the filter tap coefficients of the equalizer that are in a stable state for a predetermined period of time after the initial operation of the equalizer and stores the filter tap coefficients.

According to an aspect of the present invention, there is also provided an apparatus to update filter tap coefficients of an equalizer, in which a filter unit filters an error signal in an input signal, wherein the input signal is an RF signal reflected from an optical disc. A defect signal detection unit detects whether the input signal is defective and outputting an update stop signal indicative thereof. A coefficient updating unit stops the updating of the filter tap coefficients of the filter unit and outputs current filter tap coefficients to the filter unit, when an update stop signal indicates that updating is to be stopped, or updating the filter tap coefficients and outputting the updated filter tap coefficients to the filter unit when the update stop signal does not indicate that updating is to be stopped. A control unit outputs a predetermined reference voltage, determines whether the input signal is defective to the defect signal detection unit and outputs predetermined initial filter tap coefficient values. An initial coefficient value storage unit receives the initial filter tap coefficient values from the control unit, stores the received initial filter tap coefficient values, and outputs the initial filter tap coefficient values to the coefficient updating unit. A re-initialization signal generation unit receives filter tap coefficients from the coefficient updating unit, detect s whether the filter tap coefficients are diffused, generates a tap coefficient re-initialization signal when the filter tap coefficients are diffused, and outputs the tap coefficient re-initialization signal to the coefficient updating unit. The coefficient updating unit updates the filter tap coefficients using the initial filter tap coefficient values received from the initial coefficient value storage unit in response to the tap coefficient re-initialization signal.

According to an aspect of the present invention, the defect signal detection unit receives a track jump signal, detects whether the track jump signal is defective, and outputs the update stop signal indicative thereof. The re-initialization signal generation unit includes: an adder receiving filter tap coefficients from the coefficient updating unit, adding the received filter tap coefficients, and outputting an output value indicative thereof; and a comparator comparing the output value of the adder with the predetermined reference value received from the control unit. The adder obtains a sum T1 of the filter tap coefficients received from the coefficient updating unit, and the comparator receives a bottom threshold TH1 and a top threshold TH2 from the control unit and outputs the filter tap coefficient re-initialization signal when the sum T1 is smaller than the bottom threshold TH1 or greater than the top threshold TH2.

According to an aspect of the present invention, the initial coefficient value storage unit receives from the control unit the filter tap coefficients of the equalizer that are stabilized a predetermined period of time after the initial operation of the equalizer and stores the received filter tap coefficients.

According to another aspect of the present invention, there is provided a method of updating the filter tap coefficients of an equalizer receiving an input signal, wherein the input signal is an RF signal reflected from an optical disc; detecting whether the input signal is defective; and stopping the updating of the filter tap coefficients of the equalizer and outputting the current filter tap coefficients to the equalizer when a defect is detected from the input signal.

According to an aspect of the present invention, when the RF signal reflected by an optical disc is received, a track jump signal is further received and undergoes the defect detection and the filter tap coefficient updating.

According to an aspect of the present invention, in the defect detection, a predetermined reference value is compared with the input signal.

According to another aspect of the present invention, there is also provided a method of updating the filter tap coefficients of an equalizer, including receiving a plurality of filter tap coefficients of the equalizer filter unit; obtaining a reference value from the filter tap coefficients to determine whether filter tap coefficient re-initialization is to be performed; and comparing the reference value with a predetermined standard value and re-initializing the filter tap coefficients.

According to an aspect of the present invention, in the obtaining of the reference value, a sum T1 of all of the filter tap coefficients is determined as the reference value. The filter tap coefficients are re-initialized when the sum T1 is smaller than a bottom threshold TH1 or greater than a top threshold TH2.

According to an aspect of the present invention, in the filter tap coefficient re-initialization step, the filter tap coefficients of the equalizer are re-initialized using filter tap coefficients pre-stored in the equalizer stabilized for a predetermined period of time after the initial operation of the equalizer.

According to another aspect of the present invention, there is also provided a method of updating the filter tap coefficients of an equalizer, receiving an input signal, wherein the input signal is an RF signal reflected from an optical disc; detecting whether the input signal is defective; stopping the updating of the filter tap coefficients of the equalizer and outputting current filter tap coefficients to the equalizer when a defect is detected from the input signal; obtaining a reference value to determine whether filter tap coefficient re-initialization is to be performed from the filter tap coefficients when no defects are detected from the input signal; and comparing the reference value with a predetermined standard value and re-initializing the filter tap coefficients.

According to an aspect of the present invention, when the RF signal reflected by the optical disc is received, a track jump signal is further received and undergoes the defect detection and the filter tap coefficient updating.

According to an aspect of the present invention, in the defect detection, a predetermined reference value is compared with the input signal.

According to an aspect of the present invention, in the reference value obtaining operation, a sum T1 of the filter tap coefficients is determined as the reference value. If the sum T1 is smaller than a bottom threshold TH1 or greater than a top threshold TH2, the filter tap coefficients are re-initialized.

According to an aspect of the present invention, in the filter tap coefficient re-initialization operation, the filter tap coefficients of the equalizer are re-initialized using filter tap coefficients pre-stored in the equalizer stabilized for a predetermined period of time after an initial operation of the equalizer.

According to an aspect of the present invention, there is provided an apparatus to update filter tap coefficients of an equalizer, the apparatus including a defect signal detection unit receiving a sampled input signal reflected from an optical disc and/or a track jump signal, detecting whether the input signal and/or the track jump signal are defective, and outputting an update stop signal indicative thereof; and a coefficient updating unit stopping the updating of the filter tap coefficients in response to the update stop signal and outputting current filter tap coefficients.

According to an aspect of the present invention, there is provided a method of updating filter tap coefficients of an equalizer, the method including: receiving a sampled input signal reflected from an optical disc and/or a track jump signal; detecting whether the input signal and/or the track jump signal are defective; outputting an update stop signal indicative thereof; and stopping the updating of the filter tap coefficients in response to the update stop signal; and outputting current filter tap coefficients.

According to an aspect of the present invention, there is provided a computer readable recording medium that stores a program to implement a method of updating filter tap coefficients of an equalizer, including: receiving a sampled input signal reflected from an optical disc and/or a track jump signal; detecting whether the input signal and/or the track jump signal are defective; outputting an update stop signal indicative thereof; and stopping the updating of the filter tap coefficients in response to the update stop signal; and outputting current filter tap coefficients.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
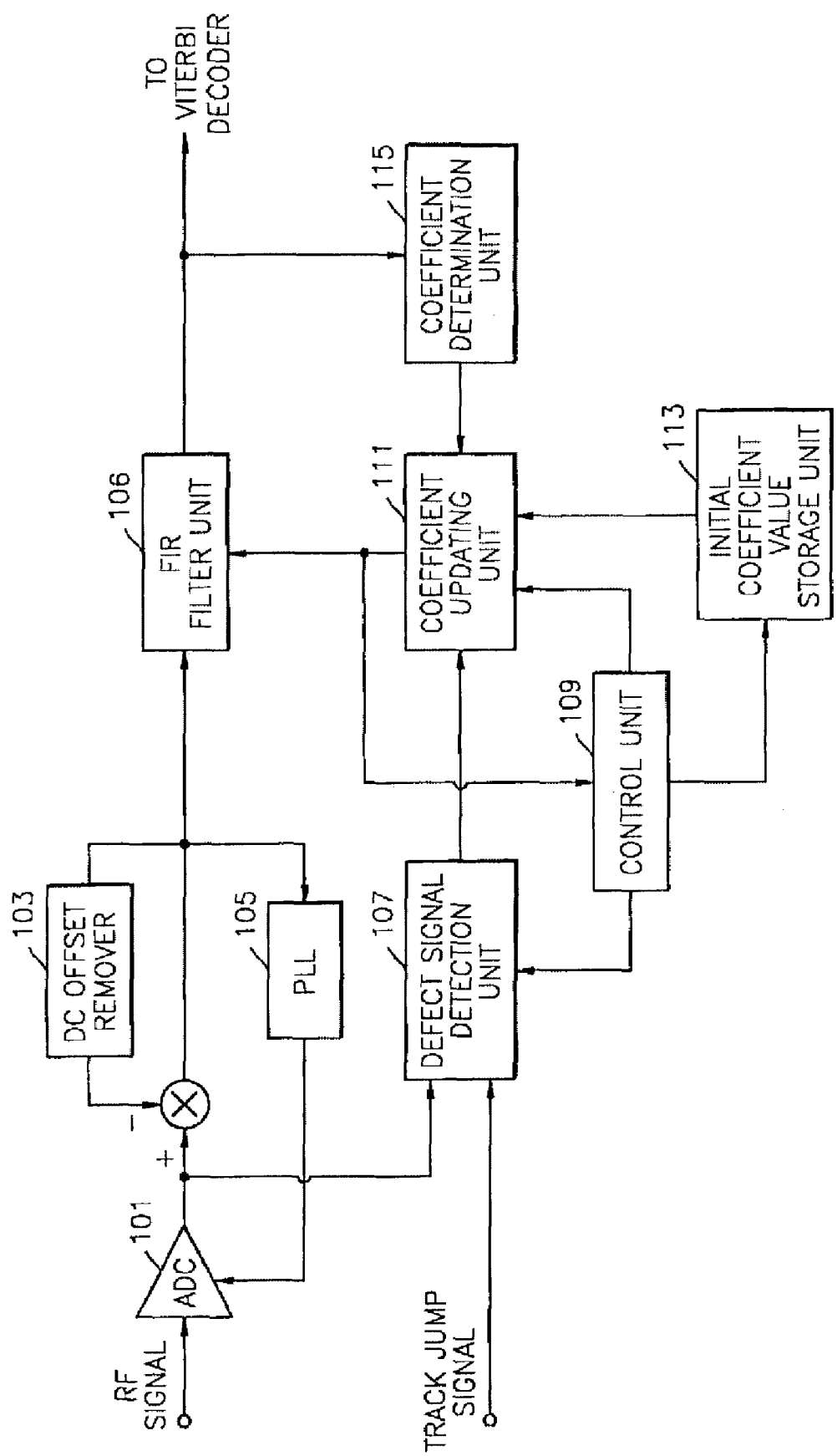
FIG. 1 is a block diagram of an apparatus to update filter tap coefficients of an equalizer, according to a first aspect of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

When defects exist on an optical disc or a track jumping occurs, a radio frequency (RF) signal is unstablized, such that an error is generated when updating filter tap coefficients of an equalizer. Such defects can be solved by detecting an abnormal state such as the defects or the track jumping and pausing tap coefficient updating during a period of the abnormal state.

An apparatus and method of detecting the abnormal state and the pausing tap of the coefficient updating during the period of the abnormal state are described with reference to FIGS. 1 and 2.

FIG. 1 is a block diagram of an apparatus for updating the filter tap coefficients of the equalizer, according to a first aspect of the present invention. An analog-to-digital converter (ADC) 101 receives an electrical RF signal corresponding to an amount of laser light reflected from the optical disc, samples the RF signal, and converts a resultant RF signal into a digital signal.

A direct current (DC) offset remover 103 removes a DC offset from the sampled RF signal. A phase locked loop (PLL) 105 produces a system clock signal. A finite impulse response (FIR) filter unit 106 including a plurality of digital filters receives the digital signal of the ADC 101 and sets a waveform of the RF signal so that the RF signal has a level required by a Viterbi decoder.

A defect signal detection unit 107 receives the sampled RF signal from the ADC 101 and/or a track jump signal, representing a signal indicative of a pick-up unit (not shown) jumping a track, from a servo unit (not shown), checks if the RF signal has a defect, and outputs an update stop signal indicating whether the tap coefficient updating is to be stopped.

To be more specific, if a defect exists on the optical disc or a laser jumps a track, the RF signal becomes larger or smaller compared to a normal case. When such an abnormal RF signal is received, a defect signal indicating that the received RF signal is abnormal is generated.

In order to detect the defect, the defect signal detection unit 107 receives the sampled RF signal from the ADC 101, detects upper and lower thresholds of the received sampled RF signal using a filter (not shown), and applies the detected upper and lower thresholds to a comparator (not shown). If the upper and lower thresholds of the received sampled RF signal are greater or smaller than corresponding reference values, the defect signal is generated.

In the meantime, in order to detect track jumping, the defect signal detection unit 107 receives the track jump signal from the servo unit (not shown) and generates the defect signal using the track jump signal.

As described above, the defect signal detection unit 107 outputs an update stop signal for stopping the tap coefficient updating when the defect signal detection unit 107 detects a defective RF signal corresponding to the defect or the track jump.

When a system resumes, a coefficient updating unit 111 receives an initialization signal from a control unit 109, reads initial values from a coefficient initial value storage unit 113, and supplies a tap coefficient to the FIR filter unit 106. Thereafter, the coefficient updating unit 111 receives data regarding the tap coefficient updating from a coefficient determination unit 115 and updates the filter tap coefficients. During coefficient updating, when the coefficient updating unit 111 receives from the defect signal detection unit 107 an update stop signal that commands the coefficient updating to be stopped, the defect signal detection unit 107 stops the coefficient updating and outputs current filter tap coefficients to the FIR filter unit 106 in order to prevent the filter tap coefficients from being diffused to unstable region values.

The coefficient initial value storage unit 113 receives initial filter tap coefficient values from the control unit 109, stores the same, and outputs the same to the coefficient updating unit 111. As to the initial filter tap coefficient values, the control unit 109 receives the filter tap coefficients of the equalizer being in a stable state a certain period of time after the initial operation from the coefficient updating unit 111, and then outputs the received filter tap coefficients to the initial coefficient value storage unit 113. The initial coefficient value stage unit 113 may store the filter tap coefficients received from the control unit 109 as the initial values. For example, coefficient values 300 ms after disc rotation may be set to be the initial values.

Alternatively, the initial coefficient value storage unit 113 may receive initial filter tap coefficient values pre-set as default values from the control unit 109 and store the values as the initial values. In the case of an 11-tap filter, if a tap coefficient is $C_i$ (where i is an integer in the range of 0 to 10), $C_4$, $C_5$, and $C_6$ are 1 and the other filter tap coefficients are 0.

The coefficient determination unit 115 calculates data for a tap coefficient update and provides the calculated data to the coefficient updating unit 111. There are various different conventional algorithms for determining a new coefficient. An example of a conventional algorithm is a least mean square (LMS) algorithm, which is disclosed in detail in Korean Publication Patent No. 2001-45325.

Figure 2:
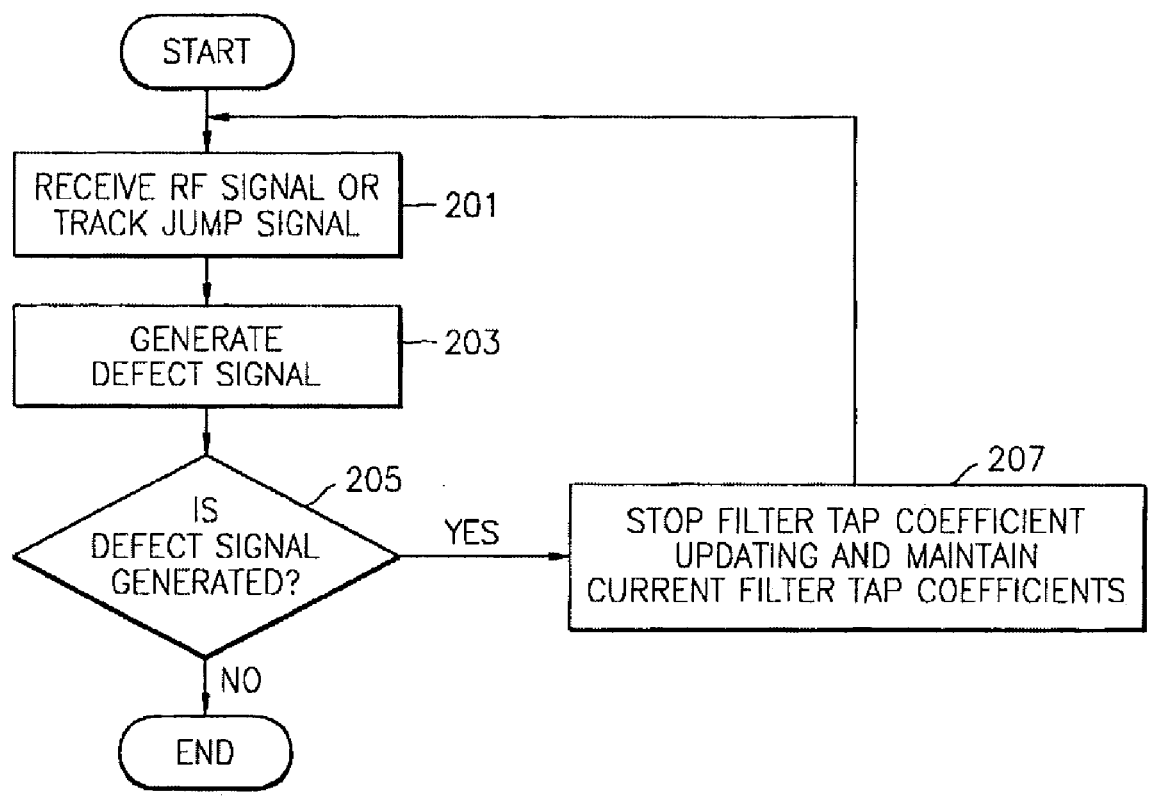
FIG. 2 is a flowchart illustrating a tap coefficient updating method performed in the apparatus to update the tap coefficients, according to the first aspect of the present invention.

FIG. 2 is a flowchart illustrating a tap coefficient updating method performed in the tap coefficient updating apparatus according to the first aspect of the present invention. At operation 201, the RF signal, which is an electrical signal into which the laser reflected from the optical disk is converted, is applied to the ADC 101, and the defect signal detection unit 107 receives the sampled RF signal from the ADC 101 and/or the track jump signal from the servo unit (not shown).

At operation 203, the defect signal detection unit 107 checks if the RF signal has a defect, in response to the RF signal and/or the track jump signal.

At operation 205, if the defect is detected from the RF signal, at operation 207, the defect signal detection unit 107 outputs the update stop signal to the coefficient updating unit 111, and accordingly, the coefficient updating unit 111 stops updating the filter tap coefficients and outputs the current filter tap coefficients to the FIR filter unit 106. Accordingly, the coefficient updating is stopped when the defect is detected from the RF signal, thereby preventing the filter tap coefficients from being diffused into the unstable regions.

Figure 3:
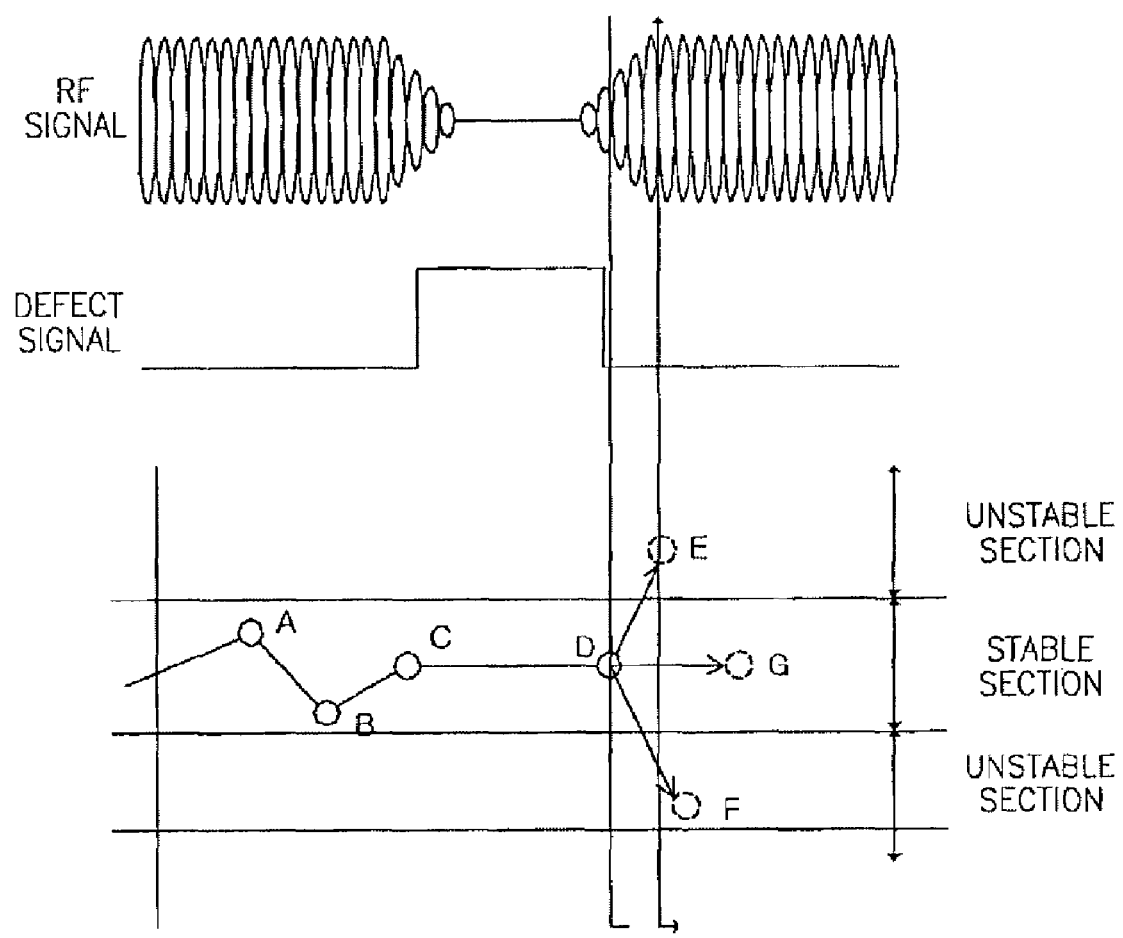
FIGS. 3 and 4 illustrate a problem generated when the tap coefficient updating method is stopped, according to the first aspect of the present invention.
Figure 4:
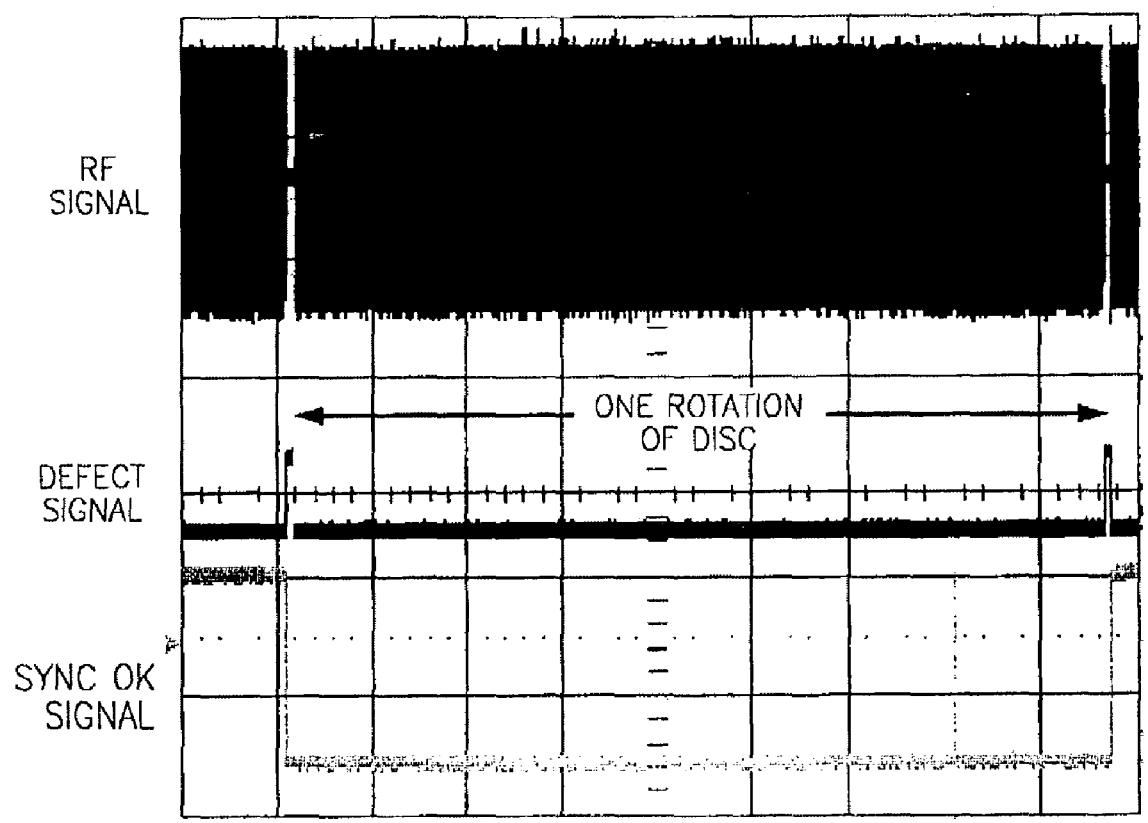

FIGS. 3 and 4 illustrate the filter tap coefficients being diffused.

FIG. 3 is a conceptual view illustrating the defective RF signal, the detected defect signal, and a process for updating the filter tap coefficients. Referring to FIG. 3, the defective RF signal has a weak level during a defect period, and the defect signal detection unit 107 detects the defect signal. That is, the defect signal turns into an update stop signal and the update stop signal is applied to the coefficient updating unit 111 in order to stop updating over the defect period. Hence, a sum of the filter tap coefficients, $\Sigma C_i$, remains constant during the defect period from a point C to a point D when the coefficient updating stops. The sum of the filter tap coefficients, $\Sigma C_i$, serves as a reference value representing whether the filter tap coefficients of the equalizer are normally updated.

Immediately after the point D, the defect period is terminated, and coefficient updating resumes. For a short period immediately after the updating resumes, the RF signal is unstable and the reference value $\Sigma C_i$ may turn into a value E or F. Thus, the RF signal reference value $\Sigma C_i$ belongs to an unstable section.

FIG. 4 shows a malfunction of a system due to a diffusion of the filter tap coefficients into an unstable section during the above-described transition period between points D and E or points D and F. The coefficient updating is paused during the defect period, but the filter tap coefficients are diffused during a transition period, such that a sync detector outputs a low sync ok signal that indicates a malfunction of the system. A high sync ok signal represents a normal operation of the system.

Figure 5:
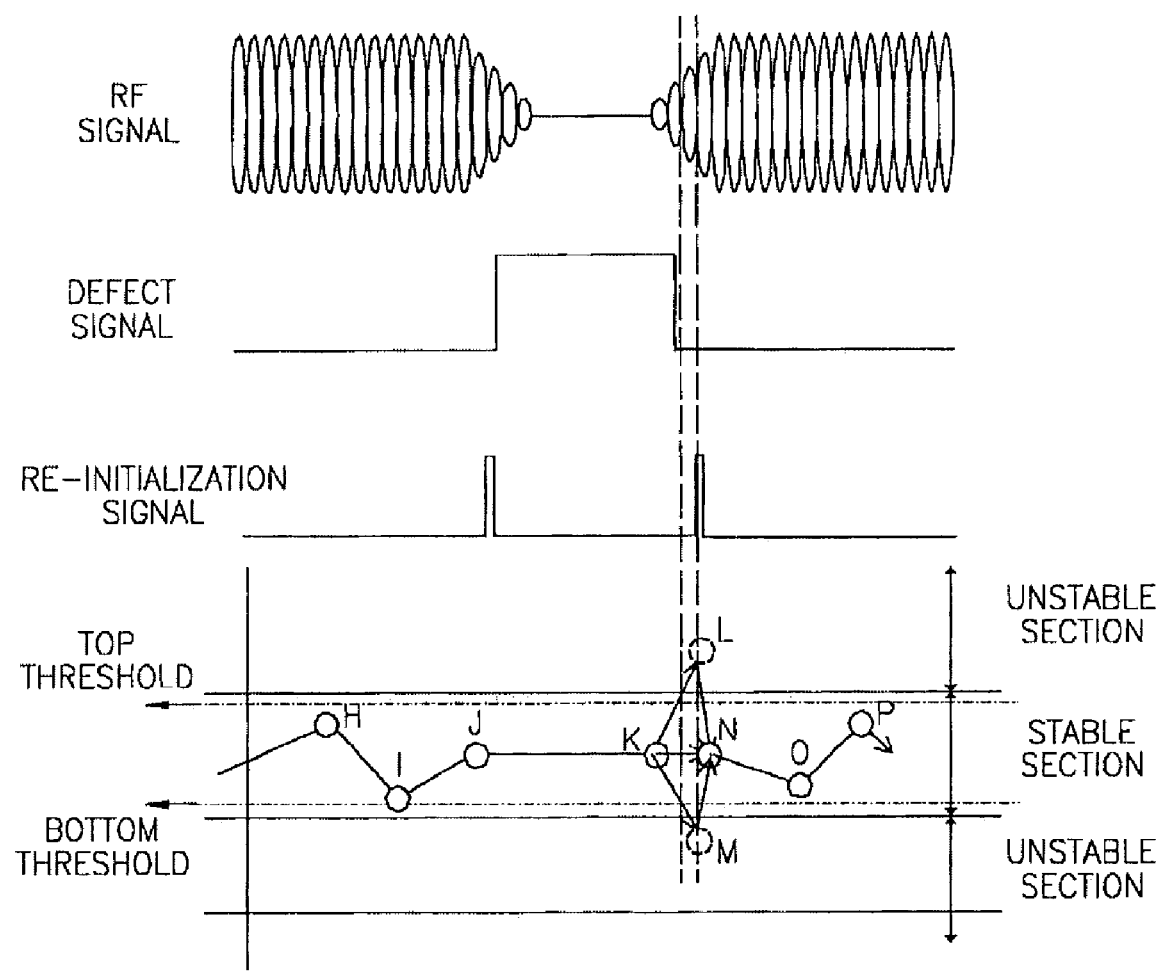
FIG. 5 is a conceptual view to explain tap coefficient re-initialization.

FIG. 5 is a conceptual view explaining tap coefficient re-initialization in order to solve the system malfunction problem described in FIG. 4. Referring to FIG. 5, when the reference value $\Sigma C_i$ is not updated to a stable section between a top threshold and a bottom threshold but to an unstable section during the transition period, the tap coefficient updating stops and initialization resumes, so that the reference value $\Sigma C_i$ is located in the stable section.

Hereinafter, a tap coefficient updating apparatus and method, which solve the system malfunction problem will be described with reference to FIGS. 6 through 10.

Figure 6:
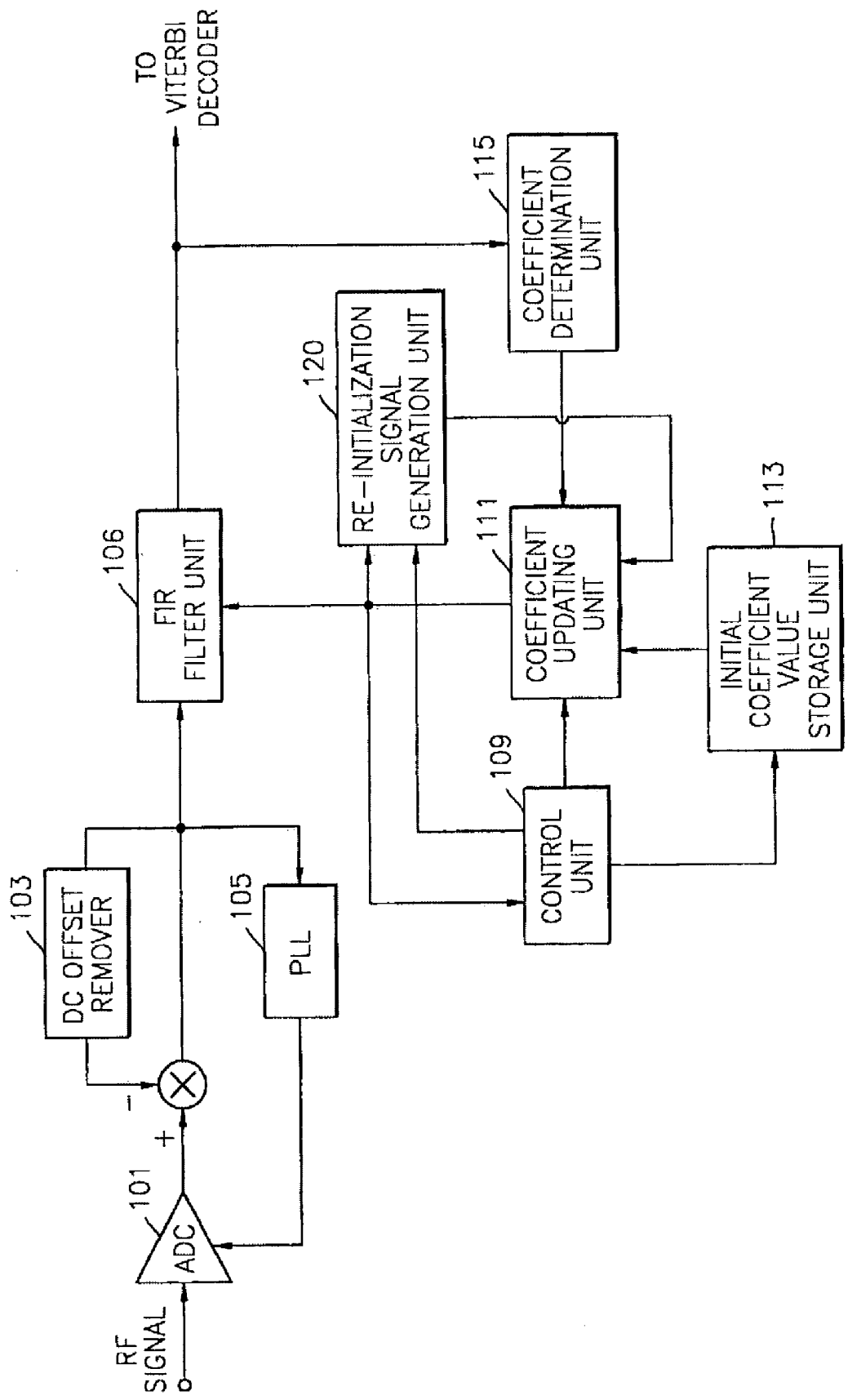
FIG. 6 is a block diagram of an apparatus to update the filter tap coefficients of the equalizer, according to a second aspect of the present invention.

FIG. 6 is a block diagram of an apparatus for updating the filter tap coefficients of the equalizer, according to a second aspect of the present invention. Because the tap coefficient updating apparatus, according to the second aspect, is similar to the tap coefficient updating apparatus of FIG. 1, only the different elements will be described without description of like elements.

A re-initialization signal generation unit 120 receives the filter tap coefficients from the control unit 109, detects whether the filter tap coefficients are diffused, generates a tap coefficient re-initialization signal if the filter tap coefficients are diffused, and outputs the tap coefficient re-initialization signal to the coefficient updating unit 111.

In response to the tap-coefficient re-initialization signal, the coefficient updating unit 111 updates filter tap coefficients using the initial coefficient values received from the initial coefficient value storage unit 113.

The initial coefficient value storage unit 113 outputs pre-stored initial coefficient values to the coefficient updating unit 111. When the coefficient updating unit 111 receives the tap coefficient re-initialization signal, the coefficient updating unit 111 reads an initial filter tap coefficient value from the initial coefficient value storage unit 113 and initializes the filter tap coefficients. As to the initial filter tap coefficient values, the control unit 109 receives the filter tap coefficients of the equalizer that are in a stable state for a certain period of time after the initial operation of the equalizer from the coefficient updating unit 111, and then outputs the received filter tap coefficients to the initial coefficient value storage unit 113. The initial coefficient value stage unit 113 may store the filter tap coefficients received from the control unit 109 as the initial values. For example, coefficient values 300 ms after rotation of the disc when a re-initialization signal is 0, that is, in a normal system when re-initialization is not performed, are set as the initial values.

Alternatively, the initial coefficient value storage unit 113 may receive the initial filter tap coefficient values pre-set as the default values from the control unit 109 and stores the default values as initial values. In the case of an 11-tap filter, if a filter tap coefficient is $C_i$ (where i is an integer in the range of 0 to 10), $C_4$, $C_5$, and $C_6$ are 1 and the other filter tap coefficients are 0.

The control unit 109 provides predetermined reference values to the re-initialization signal generation unit 120 and outputs the control signal so that the re-initialization signal generation unit 120 performs a predetermined operation.

Figure 7:
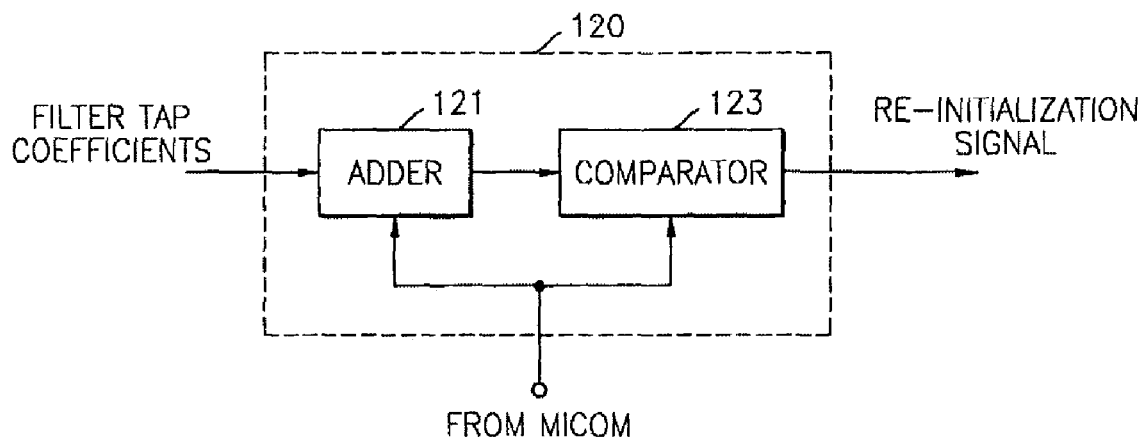
FIG. 7 is a block diagram of a re-initialization signal generation unit of FIG. 6.

FIG. 7 shows the re-initialization signal generation unit 120 including an adder 121 and a comparator 123. When the control signal of the control unit 109 is input to the adder 121, the adder 121 sums the filter tap coefficients received from the coefficient updating unit 111 to obtain and output a value T1 to the comparator 123.

Alternatively, the adder 121 adds the filter tap coefficients excluding a predetermined filter tap coefficient $C_k$, among the filter tap coefficients received from the coefficient updating unit 111, to obtain a value T2. Next, the adder 121 receives a bottom threshold TH3 and a top threshold TH4 the control unit 109, adds the value T2 to the bottom threshold TH3 to obtain a value T3, and adds the value T2 to the top threshold TH4 to obtain a value T4. Then, the adder 121 outputs the predetermined filter tap coefficient $C_k$ and the values T3 and T4 to the comparator 123. For example, the predetermined filter tap coefficient $C_k$ is the tap coefficient of a filter located at the center, among the plurality of filters included in the FIR filter unit 106.

In response to the value T1 from the adder 121 and the control signal from the control unit 109, the comparator 123 receives a bottom threshold TH1 and a top threshold TH2 from the control unit 109. If the value T1 is greater than TH2 and smaller than TH1, in response to the control signal from the control unit 109, the comparator 123 outputs a re-initialization signal for re-initializing the filter tap coefficients of the coefficient updating unit 111 to the coefficient updating unit 111.

Alternatively, in response to the predetermined filter tap coefficients $C_k$, T3, and T4 from the adder 121 and the control signal from the control unit 109, the comparator 123 receives the bottom threshold TH1 and the top threshold TH2 from the control unit 109. If the value T1 is greater than TH2 and smaller than TH1, in response to a control signal from the control unit 109, the comparator 123 outputs a re-initialization signal to re-initialize the filter tap coefficients of the coefficient updating unit 111 to the coefficient updating unit 111.

Figure 8:
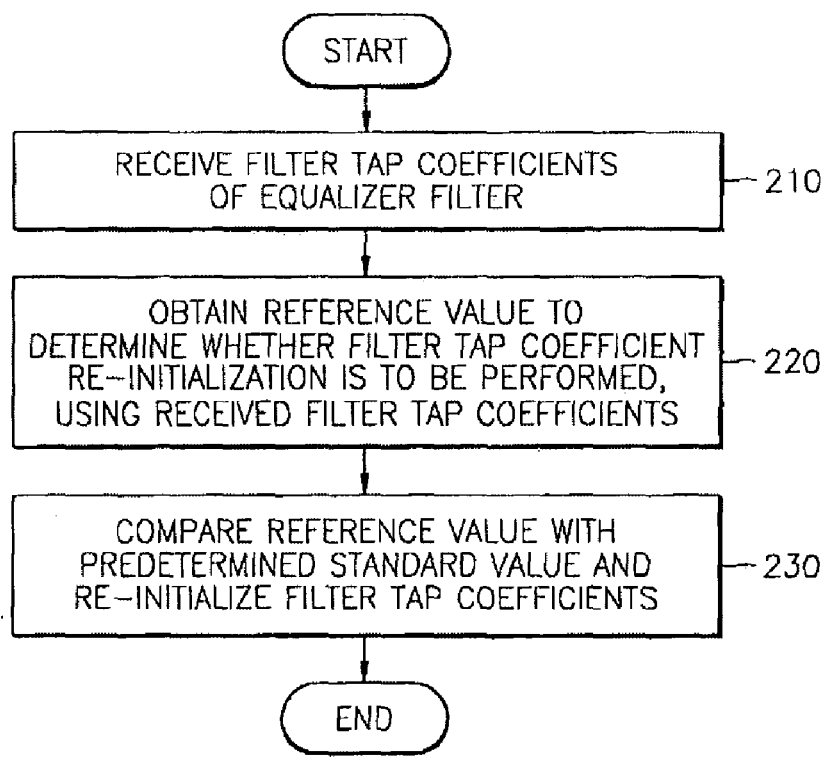
FIG. 8 is a flowchart illustrating the tap coefficient updating method performed in the apparatus to update the tap coefficients, according to the second aspect of the present invention.

FIG. 8 is a flowchart illustrating a filter tap coefficient updating method performed in the filter tap coefficient updating apparatus, according to the second aspect of the present invention. At operation 210, the re-initialization signal generation unit 120 receives the filter tap coefficients of an equalizer filter from the coefficient updating unit 111.

At operation 220, the adder 121 of the re-initialization signal generation unit 120 obtains a reference value to determine whether the filter tap coefficients are to be re-initialized using the received filter tap coefficients. Here, the reference value is either the value T1, which is the sum of all of the received filter tap coefficients, or the value T2, which is the sum of the received filter tap coefficients excluding the predetermined filter tap coefficient $C_k$.

At operation 230, the comparator 123 of the re-initialization signal generation unit 120 compares the reference value received from the adder 121 with a predetermined standard value and outputs a re-initialization signal to the coefficient updating unit 111 so that the coefficient updating unit 111 re-initializes the filter tap coefficients. The predetermined standard value can be the top threshold or the bottom threshold.

Figure 9:
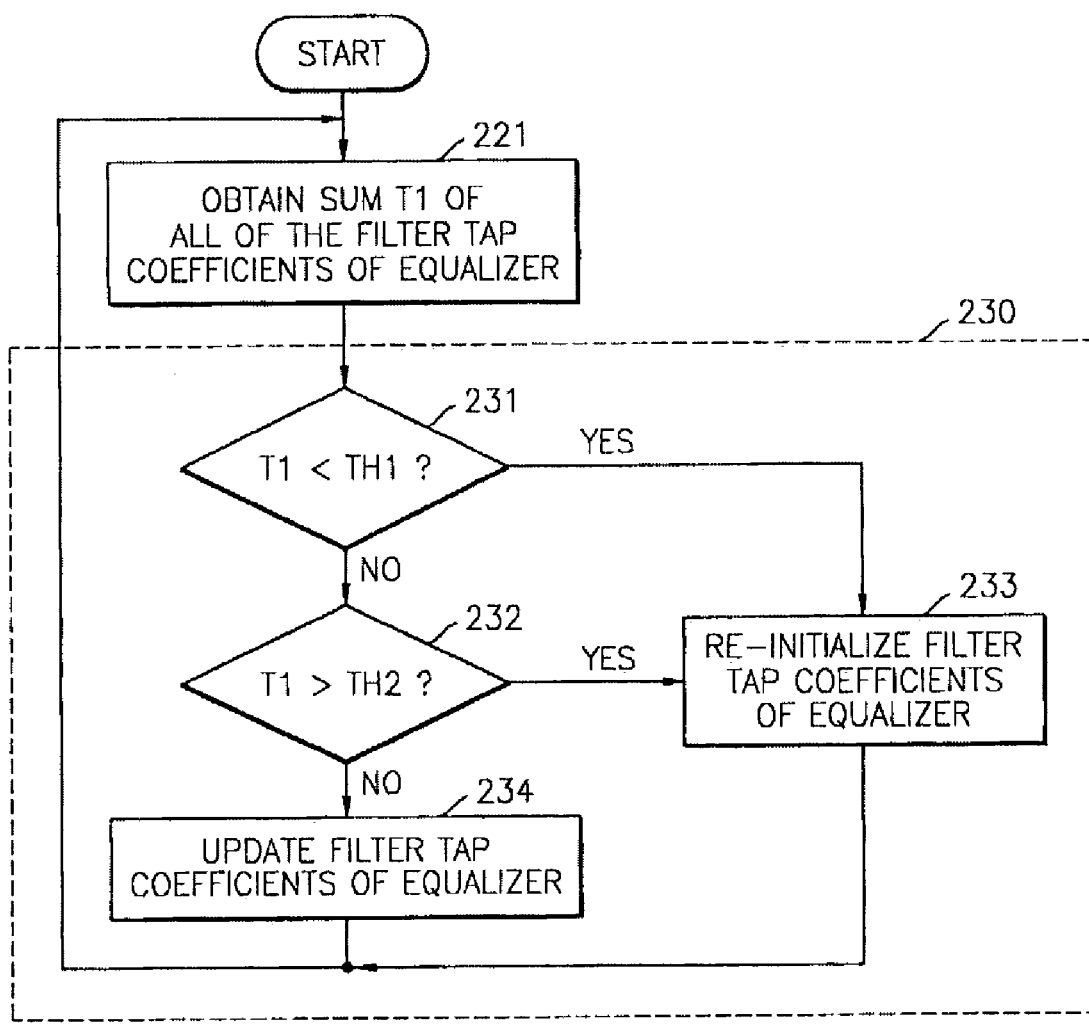
FIG. 9 is a flowchart illustrating obtaining a reference value of FIG. 8.
Figure 10:
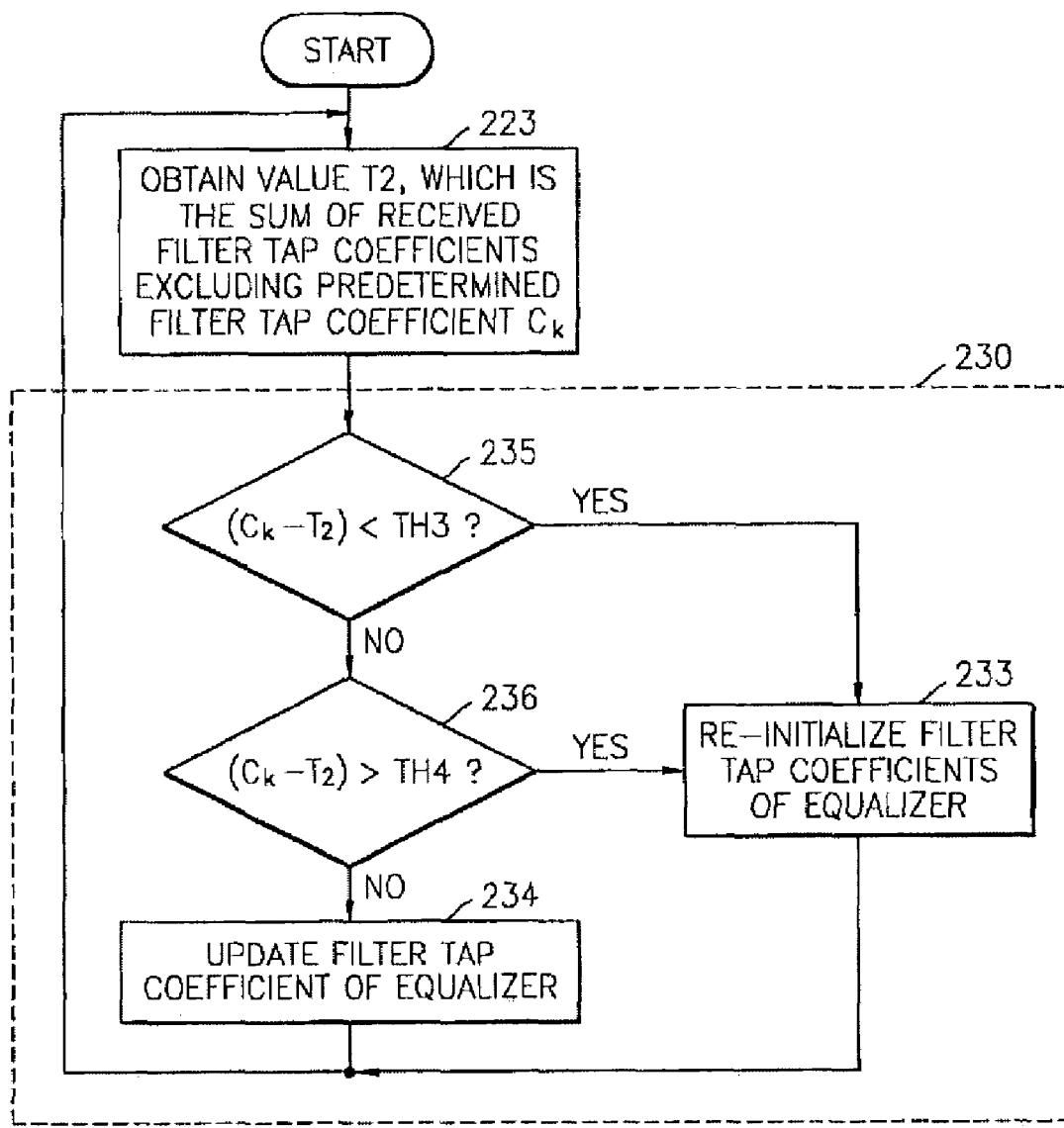
FIG. 10 is a flowchart illustrating comparing the reference value with a standard value of FIG. 8.

FIGS. 9 and 10 are flowcharts illustrating operations 220 and 230 of FIG. 8, respectively, in greater detail. Referring to FIG. 9, operation 221 corresponds to a case when the value T1 is used as the reference value in Operation 220 of FIG. 8. Operation 230 of FIG. 8 includes operations 231 through 234.

At operation 221, the adder 121 adds the received filter tap coefficients to obtain the value T1 as the reference value.

At operation 231, the comparator 213 determines whether the reference value T1 received from the adder 121 is smaller than the bottom threshold TH1.

If the reference value T1 is greater than or equal to the bottom threshold TH1, at operation 232, another determination is made as to whether the reference value T1 is greater than the top threshold TH2.

As to the bottom threshold TH1 and the top threshold TH2, the tap coefficient sum T1 experimentally determines a minimum value and a maximum value when the equalizer is in the stable section, that is, operates normally. The experimentally determined minimum and maximum values are determined as the bottom threshold TH1 and the top threshold TH2, respectively. In an aspect of the present invention, TH1 is 0.25, and TH2 is 4.

After operation 232, if the reference value T1 is smaller than or equal to the top threshold TH2, at operation 234, the coefficient updating unit 111 updates the filter tap coefficients of the equalizer.

If it is determined at operation 231 that the reference value T1 is less than the bottom threshold TH1, or if it is determined at operation 232 that the reference value T1 is greater than the top threshold TH2, the re-initialization signal generation unit 120 outputs the re-initialization signal to the coefficient updating unit 111 so that the coefficient updating unit 111 re-initializes the filter tap coefficients of the equalizer.

The initial filter tap coefficient values can be pre-stored as the filter tap coefficients of the equalizer that are in the stable state for a predetermined period of time after the initial operation of the equalizer. The pre-stored filter tap coefficients can be used to re-initialize the filter tap coefficients. Alternatively, the initial filter tap coefficient values that are pre-set in the control unit 109 can be used to re-initialize the filter tap coefficients.

After each of the operations 233 and 234, the method goes back to operation 221.

Referring to FIG. 10, operation 223 corresponds to a case when the value T2 is used as the reference value in operation 220 of FIG. 8. The operation 230 of FIG. 8 includes operations 233 through 236.

At operation 223, the adder 121 adds the filter tap coefficients excluding the predetermined filter tap coefficient $C_k$, among the received filter tap coefficients, to obtain the value T2 as the reference value.

At operation 235, the comparator 123 determines whether a value $(C_k-T2)$ is less than the bottom threshold TH3.

In At operation 236, if the value $(C_k-T2)$ is greater than or equal to the bottom threshold TH3, another determination is made as to whether the value $(C_k-T2)$ is greater than the top threshold TH4.

The bottom threshold TH3 and the top threshold TH4 can be experimentally determined in the same way as the bottom threshold TH1 and the top threshold TH2.

Then, at operation 234, if the value $(C_k-T2)$ is less than or equal to the top threshold TH4, the coefficient updating unit 111 normally updates the filter tap coefficients of the equalizer.

If it is determined at operation 235 that the value $(C_k-T2)$ is less than the bottom threshold TH3, or if it is determined at operation 236 that the value $(C_k-T2)$ is greater than the top threshold TH4, at operation 233, the re-initialization signal generation unit 120 outputs the re-initialization signal to the coefficient updating unit 111 so that the coefficient updating unit 111 re-initializes the filter tap coefficients of the equalizer.

The initial filter tap coefficient values can be the pre-stored filter tap coefficients of an equalizer that are in the stable state for the predetermined period of time after the initial operation of the equalizer. The pre-stored filter tap coefficients can be used to re-initialize the filter tap coefficients. Alternatively, the initial filter tap coefficient values pre-set in the control unit 109 can be used to re-initialize the filter tap coefficients.

After each of operations 233 and 234, the method goes back to operation 223.

Hereinafter, the filter tap coefficient updating apparatus and method, according to a third aspect of the present invention, will be described with reference to FIGS. 11 and 12.

The apparatus and method of updating the filter tap coefficients of the equalizer, according to an aspect of the present invention, can be achieved by combining the first and second aspects of the present invention. That is, in a combined aspect, the defect signal corresponding to the defect generation or track jumping is detected to determine whether the filter tap coefficient updating is to be stopped. If it is determined that the filter tap coefficient updating is to be stopped, the filter tap coefficient updating is stopped. If it is determined that filter tap coefficient updating is not to be stopped, another determination is made as to whether the filter tap coefficients are diffused into the unstable section, and the filter tap coefficients are re-initialized.

Figure 11:
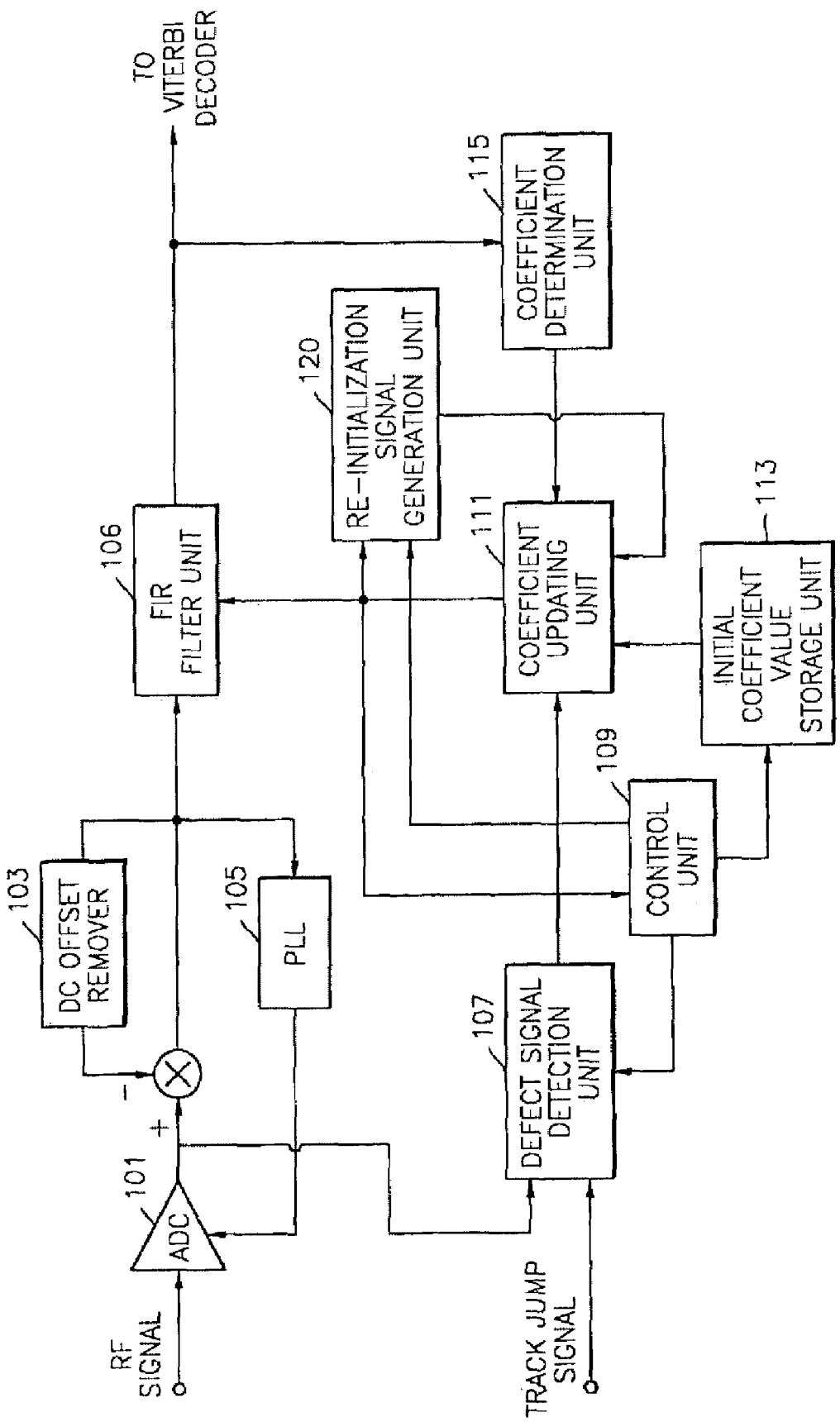
FIG. 11 is a block diagram of an apparatus to update the filter tap coefficients of the equalizer, according to a third aspect of the present invention.

FIG. 11 is a block diagram of the apparatus for updating the filter tap coefficients of the equalizer, according to the third aspect of the present invention. Because the third aspect is a combination of the filter tap coefficient updating apparatuses of FIGS. 1 and 6, only the elements that are different will be described, not the like elements.

When the RF signal and/or a track jumping signal are received by the defect signal detection unit 107, the filter tap coefficient updating apparatus, according to the third aspect of the present invention, first performs the operations of the method of FIG. 2. That is, the defect signal detection unit 107 detects whether the RF signal is defective, and outputs the updating stop signal to the coefficient updating unit 111.

If the updating stop signal is 1, which represents that updating is to be stopped, the coefficient updating unit 111 stops updating the multiple filter tap coefficients of the FIR filter unit and outputs the current filter tap coefficients to the FIR filter unit 106, as described above.

On the other hand, if the updating stop signal is 0, which represents that updating is not to be stopped, the coefficient updating unit 111 updates the filter tap coefficients and outputs the results to the FIR filter unit 106. The coefficient updating unit 111 also outputs the updated filter tap coefficients to the re-initialization signal generation unit 120. The re-initialization signal generation unit 120 performs the operations of FIGS. 8 through 10 on the updated filter tap coefficients, in order to determine whether or not the filter tap coefficients are diffused into the unstable section. If it is determined that the updated filter tap coefficients are diffused into the unstable section, the filter tap coefficients are re-initialized.

Figure 12:
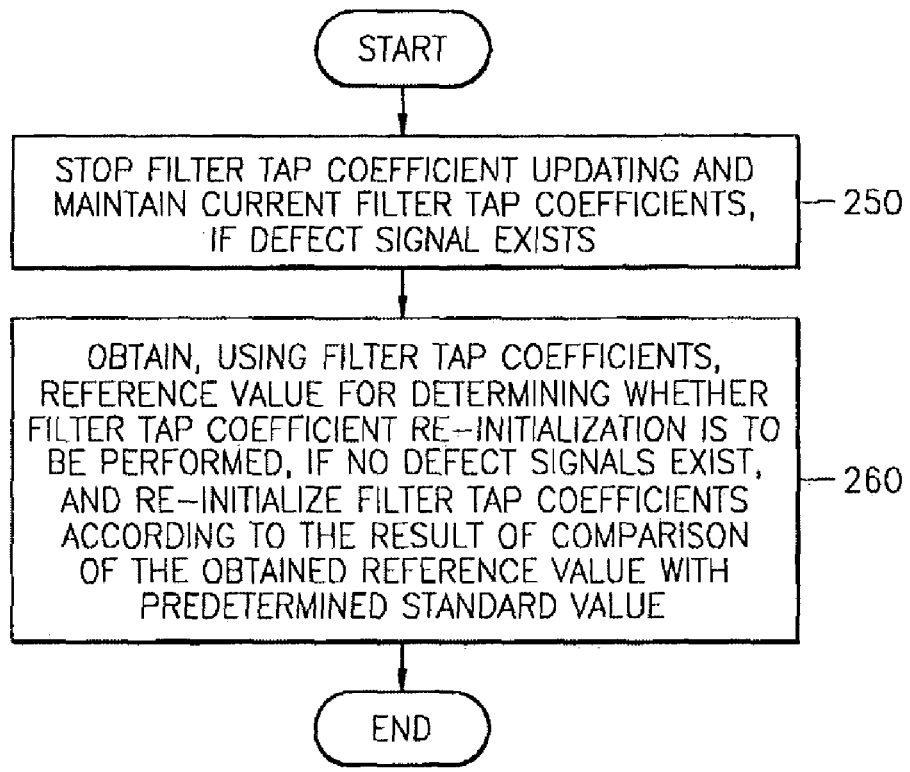
FIG. 12 is a flowchart illustrating a tap coefficient updating method performed in the apparatus to update the tap coefficients, according to the third aspect of the present invention.

FIG. 12 is a flowchart illustrating the filter tap coefficient updating method performed in the filter tap coefficient updating apparatus, according to the third aspect of the present invention. At operation 250, if it is determined that the RF signal and/or the track jump signal is the defect signal, the filter tap coefficient updating is stopped and the current filter tap coefficients are maintained. Operation 250 corresponds to operations 201 through 207 of FIG. 2.

After operation 250, if the defect signal is detected, a reference value for determining whether the filter tap coefficient re-initialization is to be performed is obtained from the filter tap coefficients, and, at operation 260, the filter tap coefficients are re-initialized according to the result of the comparison of the reference value with a predetermined standard value. Operation 260 corresponds to operations 210 through 230 of FIG. 8. Operation 260 is also achieved by performing the operations shown in FIG. 9 or 10. However, operation 260 is achieved through operations 210 through 230 only if the update stop signal output from the defect signal detection unit 107 is "0", which represents that updating is to be continued.

Figure 13:
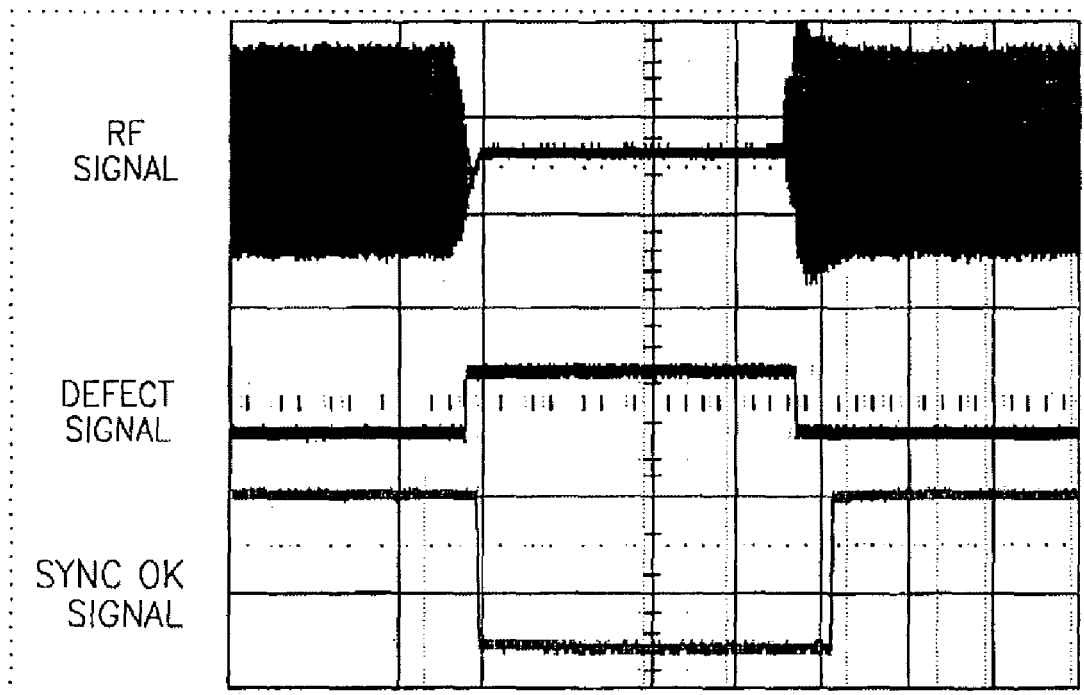
FIG. 13 illustrates waveforms representing an operation of the apparatus to update the tap coefficients, according to the first aspect of the present invention shown in FIG. 1.

FIG. 13 illustrates waveforms representing the operation of the filter tap coefficient updating apparatus according to the first aspect of the present invention shown in FIG. 1. The RF signal represents a case in which the defect exists on the optical disc. The defect signal detection unit 107 detects the defect period and outputs the defect signal, that is, an update stop signal. According to the defect signal, which is the update stop signal, the coefficient updating unit 111 stops coefficient updating, maintains the current filter tap coefficients, and outputs the same to the FIR filter unit 106. Accordingly, a sync okay signal that represents whether a system is operating normally after the defect period remains at a high value, which shows that the system operates normally.

Figure 14A:
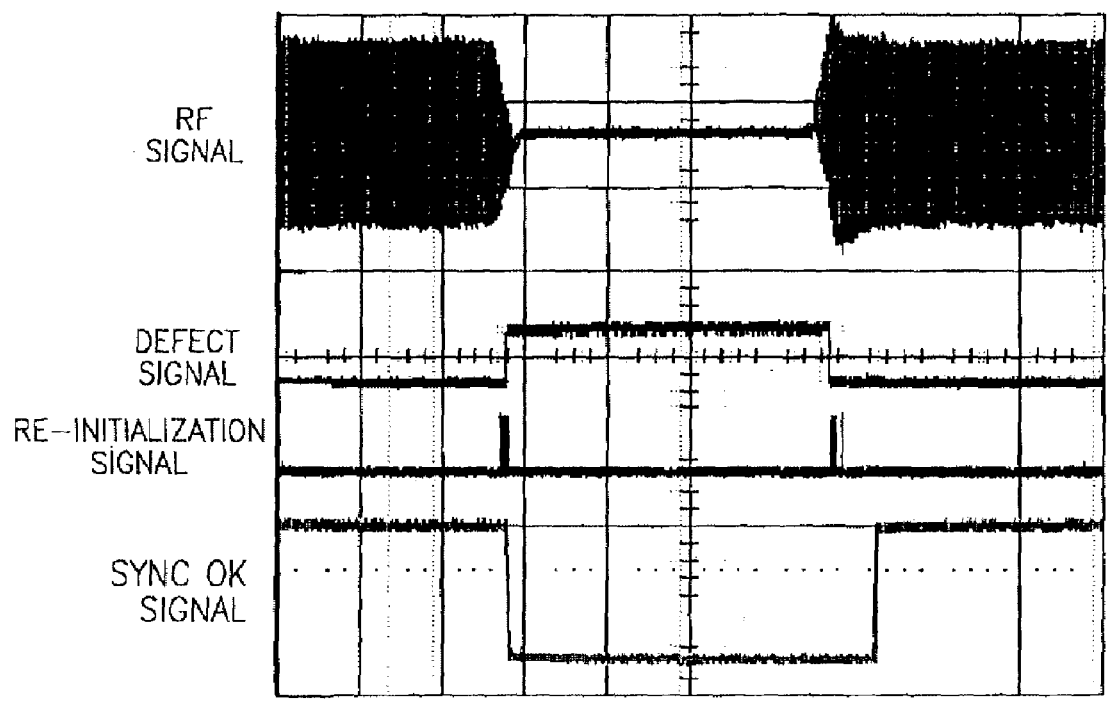
FIGS. 14A and 14B illustrate waveforms representing the operation of the apparatus to update the tap coefficients, according to the third aspect of the present invention shown in FIG. 11.
Figure 14B:
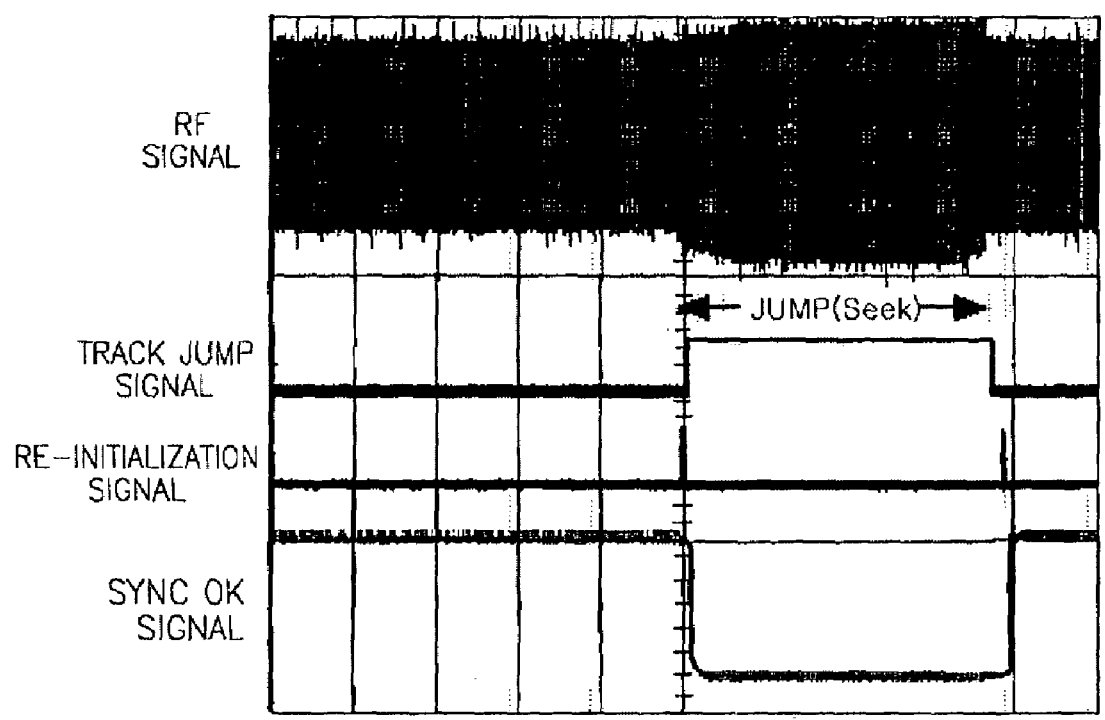

The operation of the filter tap coefficient updating apparatus, according to the third aspect of the present invention shown in FIG. 1, is illustrated through the waveforms of FIGS. 14A and 14B. FIG. 14A shows a waveform representing the operation of the filter tap coefficient updating apparatus of FIG. 11 in the case of the RF signal. The defect signal detection unit 107 detects the defect period and outputs the defect signal, that is, the update stop signal. Immediately before the defect signal is generated and immediately after the defect signal ends, the re-initialization signal is produced by the re-initialization signal generation unit 120 in order to re-initialize the filter tap coefficients. The sync okay signal that represents whether the system is operating normally after the defect period remains at a high value, thus, representing that the system is operating normally.

FIG. 14B shows a waveform representing the operation of the filter tap coefficient updating apparatus of FIG. 11 when a pickup unit jumps a track. The defect signal detection unit 107 detects the track jump period based on the track jump signal received from a servo unit and outputs an update stop signal, which is the track jump signal. Immediately before the track jump signal is generated and immediately after the track jump signal is terminated, the re-initialization signal is produced by the re-initialization signal generation unit 120 in order to re-initialize filter tap coefficients. The sync okay signal that represents whether the system is operating normally after the defect period keeps a high value, thus, representing that the system is operating normally.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and so on. Also, the computer readable codes on the computer readable recording medium can be transmitted via a carrier wave such as internet, can also be distributed over a network coupled computer system so that the computer readable codes are stored and executed in a distributed fashion.

As described above, in an apparatus and method of updating the filter tap coefficients of an equalizer, according to the present invention, updating of the filter tap coefficients of the equalizer is stopped, or the filter tap coefficients are re-initialized. Accordingly, the filter tap coefficient updating is normally performed without errors even if a defect exists on an optical disc or track jumping occurs, so that freezing or breaking of an image screen is prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to update filter tap coefficients for use in equalizing a waveform of an input signal, comprising:
   a filter unit provided with a plurality of filter tap coefficients to equalize a waveform of an input signal representing a laser beam reflected from an optical disc;
   a coefficient updating unit to stop the updating of the filter tap coefficients and output current filter tap coefficients to the filter unit for equalizing the waveform of the input signal, when a track jumping occurs on the optical disc during waveform equalization;
   a defect signal detection unit arranged to determine that the laser beam jumps between tracks on the optical disc, and to generate an update stop signal indicative thereof to the coefficient updating unit to stop the updating of the filter tap coefficients;

a control unit to generate a predetermined reference voltage indicative of whether the input signal is defective to the defect signal detection unit; and an initial coefficient value storage unit arranged to receive predetermined initial filter tap coefficient values from the control unit to store the received initial filter tap coefficient values, and to output the initial filter tap coefficient values to the coefficient updating unit.

2. An apparatus to update filter tap coefficients of an equalizer, the apparatus comprising:

a filter unit filtering an error signal in an input signal, wherein the input signal is an RF signal reflected from an optical disc;

a defect signal detection unit detecting whether the input signal is defective and outputting an update stop signal indicative thereof;

a coefficient updating unit stopping the updating of the filter tap coefficients of the filter unit and outputting current filter tap coefficients to the filter unit, when an update stop signal indicates that updating is to be stopped, or updating the filter tap coefficients and outputting the updated filter tap coefficients to the filter unit when the update stop signal does not indicate that updating is to be stopped;

a control unit outputting a predetermined reference voltage, determining whether the input signal is defective to the defect signal detection unit and outputting predetermined initial filter tap coefficient values;

an initial coefficient value storage unit receiving the initial filter tap coefficient values from the control unit, storing the received initial filter tap coefficient values, and outputting the initial filter tap coefficient values to the coefficient updating unit; and a re-initialization signal generation unit receiving filter tap coefficients from the coefficient updating unit, detecting whether the filter tap coefficients are diffused, generating a tap coefficient re-initialization signal when the filter tap coefficients are diffused, and outputting the tap coefficient re-initialization signal to the coefficient updating unit, wherein the coefficient updating unit updates the filter tap coefficients using the initial filter tap coefficient values received from the initial coefficient value storage unit in response to the tap coefficient re-initialization signal.

3. The apparatus of claim 2, wherein the defect signal detection unit receives a track jump signal, detects whether the track jump signal is defective, and outputs the update stop signal indicative thereof.

4. The apparatus of claim 2, wherein the re-initialization signal generation unit comprises:

an adder receiving filter tap coefficients from the coefficient updating unit, adding the received filter tap coefficients, and outputting an output value indicative thereof; and a comparator comparing the output value of the adder with the predetermined reference value received from the control unit.

5. The apparatus of claim 4, wherein the adder obtains a sum T1 of the filter tap coefficients received from the coefficient updating unit, and the comparator receives a bottom threshold TH1 and a top threshold TH2 from the control unit and outputs the filter tap coefficient re-initialization signal when the sum T1 is smaller than the bottom threshold TH1 or greater than the top threshold TH2.

6. The apparatus of claim 4, wherein the adder obtains a sum T2 of the filter tap coefficients except a predetermined filter tap coefficient $C_k$ from the filter tap coefficients received from the coefficient updating unit, receives a bottom threshold TH3 and a top threshold TH4 from the control unit, obtains a sum T3 of the sum T2 and the bottom threshold TH3, and obtains a sum T4 of the sum T2 and the top threshold TH4, and the comparator outputs the filter tap coefficient re-initialization signal when the predetermined filter tap coefficient $C_k$ is smaller than the bottom threshold TH3 or greater than the top threshold TH4.

7. The apparatus of claim 6, wherein the predetermined filter tap coefficient $C_k$ is the filter tap coefficient of a filter located at a center of the filter unit from the filter tap coefficients received from the coefficient updating unit.

8. The apparatus of claim 2, wherein the initial coefficient value storage unit receives from the control unit the filter tap coefficients of the equalizer that are stabilized a predetermined period of time after the initial operation of the equalizer and stores the received filter tap coefficients.

9. The apparatus of claim 2, wherein the initial coefficient value storage unit receives initial filter tap coefficient values pre-set in the control unit from the control unit and stores the initial filter tap coefficient values.

10. A method of updating filter tap coefficients of an equalizer filter unit, the method comprising:

receiving a plurality of filter tap coefficients of the equalizer filter unit;

obtaining a reference value from the filter tap coefficients to determine whether filter tap coefficient re-initialization is to be performed; and comparing the reference value with a predetermined standard value and re-initializing the filter tap coefficients, wherein a sum T1 of all of the filter tap coefficients of the equalizer filter unit is obtained as the reference value.

11. The method of claim 10, wherein a sum T2 of the filter tap coefficients, except a predetermined filter tap coefficient Ck from the filter tap coefficients of the equalizer is alternatively obtained as the reference value.

12. The method of claim 11, wherein the filter tap coefficients are re-initialized when a value after the sum T2 subtracted from the predetermined filter tap coefficient $C_k$ is smaller than a bottom threshold TH3 or greater than a top threshold TH4.

13. The method of claim 11, wherein the predetermined filter tap coefficient $C_k$ is a filter tap coefficient of a filter located at the center of the equalizer filter unit from the filter tap coefficients.

14. The method of claim 10, wherein the filter tap coefficients are re-initialized when the sum T1 is smaller than a bottom threshold TH1 or greater than a top threshold TH2.

15. The method of claim 10, wherein the filter tap coefficients of the equalizer filter unit are re-initialized using filter tap coefficients pre-stored in the equalizer filter unit stabilized for a predetermined period of time after the initial operation of the equalizer filter unit.

16. The method of claim 10, wherein the filter tap coefficients of the equalizer filter unit are re-initialized using initial filter tap coefficient values pre-set in the equalizer filter unit.

17. A method of updating filter tap coefficients of an equalizer, the method comprising:

receiving an input signal representing an RF signal reflected from an optical disc;

detecting whether the input signal is defective;

stopping the updating of the filter tap coefficients of the equalizer and outputting current filter tap coefficients to the equalizer when a defect is detected from the input signal;

obtaining a reference value to determine whether filter tap coefficient re-initialization is to be performed from the filter tap coefficients when no defect is detected from the input signal; and comparing the reference value with a predetermined standard value and re-initializing the filter tap coefficients.

18. The method of claim 17, further comprising:

receiving a track jump signal when a track jumping occurs on the optical disc;

stopping the updating of the filter tap coefficients and outputting the current filter tap coefficients to the equalizer upon receipt of the track jump signal;

obtaining the reference value to determine whether the filter tap coefficient re-initialization is to be performed using the filter tap coefficients; and comparing the reference value with a standard value and re-initializing the filter tap coefficients.

19. The method of claim 17, wherein a predetermined reference value is compared with the input signal to detect whether the input signal is defective.

20. The method of claim 17, wherein a sum T1 of the filter tap coefficients is obtained as the reference value.

21. The method of claim 20, wherein the filter tap coefficients are re-initialized when the sum T1 of the filter tap coefficients is smaller than a bottom threshold TH1 or greater than a top threshold TH2.

22. The method of claim 20, wherein the filter tap coefficients of the equalizer are re-initialized using filter tap coefficients pre-stored in the equalizer stabilized for a predetermined period of time after an initial operation of the equalizer.

23. The method of claim 20, wherein the filter tap coefficients of the equalizer are re-initialized using initial filter tap coefficient values pre-set in the equalizer.

24. The method of claim 17, wherein a sum T2 of the filter tap coefficients, except a predetermined filter tap coefficient $C_k$ from the filter tap coefficients of the equalizer is obtained as the reference value.

25. The method of claim 24, wherein the filter tap coefficients are re-initialized when a value of the sum T2 of the filter tap coefficients subtracted from the predetermined filter tap coefficient $C_k$ is smaller than a bottom threshold TH3 or greater than a top threshold TH4.

26. The method of claim 24, wherein the predetermined filter tap coefficient $C_k$ is the filter tap coefficient of a filter located at a center of the equalizer among the filter tap coefficients.

* * * * *